(12) United States Patent
Bayer et al.

(10) Patent No.: US 6,742,771 B2
(45) Date of Patent: Jun. 1, 2004

(54) FUEL MIXER FOR INTERNAL COMBUSTION ENGINE

(75) Inventors: Don R. Bayer, Dousman, WI (US); Gerald C. Ruehlow, Oconomowoc, WI (US)

(73) Assignee: Generac Power Systems, Inc., Waukesha, WI (US)

(*) Notice: Subject to any disclaimer, the term of this patent is extended or adjusted under 35 U.S.C. 154(b) by 0 days.

(21) Appl. No.: 10/286,528

(22) Filed: Nov. 1, 2002

(65) Prior Publication Data

US 2004/0084788 A1 May 6, 2004

(51) Int. Cl.$^7$ .............................................. F02M 13/04
(52) U.S. Cl. ...................... 261/23.2; 123/468; 123/470; 261/76
(58) Field of Search ........... 261/76, 23.2; 123/468–470

(56) References Cited

U.S. PATENT DOCUMENTS 1,495,247 A * 5/1924 Chandler ................... 261/72.1
2,103,629 A * 12/1937 Moore ........................ 261/50.1
5,890,477 A * 4/1999 Nazare ........................ 123/592
6,443,130 B1 * 9/2002 Turner et al. ................ 123/455

OTHER PUBLICATIONS

* Reference X'd was cited by applicants on p. 7 of the specification.*

* cited by examiner

Primary Examiner—Richard L. Chiesa
(74) Attorney, Agent, or Firm—Boyle Fredrickson Newholm Stein & Gratz S.C.

(57) ABSTRACT

A fuel mixer box is provided for supplying a fuel mixture to each cylinder of an engine. The fuel mixer box includes a housing defining a chamber for receiving combustion gases generated by the engine during the operation thereof. Input conduits have inputs connectable to a fuel source for receiving fuel therefrom and outputs. Output conduits have inputs communicating with the outputs of corresponding input conduits and outputs connectable to corresponding cylinders of the engine. In addition, the output conduits communicate with the chamber to receive combustion gases to be mixed with the fuel to provide the fuel mixture. In addition, fuel may be supplied directly to the output conduits through corresponding venturis within the housing.

17 Claims, 7 Drawing Sheets

FUEL MIXER FOR INTERNAL COMBUSTION ENGINE

FIELD OF THE INVENTION

This invention relates generally to internal combustion engines, and in particular, to a fuel mixer box for balancing the air/fuel mixture provided to each cylinder of an internal combustion engine.

BACKGROUND AND SUMMARY OF THE INVENTION

As is known, internal combustion engines are used in a wide variety of applications including stand-by electrical generators. When used in connection with a stand-by electrical generator, the engine is supplied with a pressured fuel source such as diesel, liquid propane and/or natural gas. The engine is directly connected to the fuel source in order that the generator may be automatically activated in the event of a power outage. It can be appreciated that various types of systems have been developed to interconnect the engine to the fuel source in order to provide the proper volume of fuel to the engine.

Heretofore, prior systems, typically incorporated a regulator having a supply chamber operatively connected to an input of an intake manifold. The intake manifold is interconnected to the corresponding cylinders of the engine. When the engine is started, fuel is drawn into the intake manifold, and hence each cylinder of the engine, by a vacuum generated by the engine during its operation. While functional for its intended purpose, the use of an engine manifold and regulator having a single chamber is inefficient since fuel is provided to each cylinder of the engine at a common pressure. As a result, each cylinder of the engine does not receive an optimum volume of fuel during operation and the engine does not generate maximum power. In addition, it has been found that the individual cylinders of the engine may not be filled equally with the fuel. This, in turn, may adversely effect the starting and operation of the internal combustion engine.

As is known, pistons are housed within corresponding cylinders of the internal combustion engine for reciprocal movement therein. During operation, fuel and air enter a combustion chamber in a corresponding cylinder on a first side of the piston. The fuel in each combustion chamber is ignited so as to cause linear motion of the pistons within their corresponding cylinders. The linear motion of the pistons is converted into vertical motion by a crankshaft.

Ideally, all of the gases in the combustion chambers after ignition of the fuel are exhausted from the combustion chamber via an exhaust pipe for the engine. However, a portion of the combustion gases may pass between the piston rings and the cylinder walls of the cylinders housing the pistons. These combustion gases contain various bi-products of combustion which may be harmful if vented into the environment. As such, in order to prevent discharge of the combustion gases directly into the environment, the combustion gases are routed through the crankcase and into the air intake system of the internal combustion engine.

In view of the foregoing, it is highly desirable to provide a mechanism for mixing the combustion gases generated by the engine during the operation thereof with the pressurized fuel supplied to the engine to provide a fuel mixture for the cylinders of the internal combustion engine. It is also highly desirable to provide a mechanism that allows for the fuel and air mixture to be provided independently to each cylinder of the engine. Further, it is also desirable to provide a mechanism that allows for control of the amount of fuel provided to each cylinder of the internal combustion engine.

Therefore, it is a primary object and feature of the present invention to provide a fuel mixer box for supply a fuel mixture to each cylinder of an engine.

It is a further object and feature of the present invention to provide a fuel mixer box that allows for the fuel mixture provided to each cylinder of an engine to be balanced.

It is a still further object and feature of the present invention to provide a fuel mixer box wherein the fuel mixture demanded by each cylinder of an engine does not effect the fuel demanded by the other cylinder.

In accordance with the present invention, a fuel mixer box is provided for supplying a fuel mixture to each cylinder of an engine. The fuel mixer box includes a first input conduit having an input connectable to a fuel source for receiving fuel therefrom and an output. A first output conduit has an input communicating with the output of the first input conduit and an output connectable to a first cylinder of the engine. An injection conduit has an input connectable to the fuel source and an output communicating with the output conduit.

The fuel mixer box includes a housing defining an interior and having an opening therein for allowing combustion gases generated by the engine to be received within the housing. The housing also defines a fuel mixture chamber interconnecting the output of the input conduit and the input of the output conduit. The fuel mixture chamber communicates with the interior of the housing. A butterfly valve may be disposed in the first output conduit. The butterfly valve is movable between a full throttle position and a closed position.

The fuel mixer box may include a second input conduit having an input connectable to the fuel source for receiving fuel therefrom and an output. A second output conduit has an input communicating with the output of the second input conduit and an output connectable to a second cylinder of the engine. The fuel mixer box also defines an injection chamber having an interior. The output of the injection conduit communicates with the interior of the injection chamber. The injection chamber includes a first venturi having an input communicating with the interior of the injection chamber and an output communicating with the first output conduit. The injection chamber also includes a second venturi having an input communicating with the interior of the injection chamber and an output communicating with the second output conduit.

It is contemplated that the fuel mixer box include a first combustion gas conduit having an input communicating with the interior of the housing and an output communicating with the first output conduit. A second combustion gas conduit has an input communicating with the interior of the housing and an output communicating with the second output conduit. A partition may be disposed within the housing between the inputs of the first and second combustion gas conduits.

In accordance with a further aspect of the present invention, a fuel mixer box is provided for supplying a fuel mixture to each cylinder of an engine. The fuel mixer box includes a housing defining an outer chamber and an inner chamber that is isolated from the outer chamber. The housing has an opening therein for allowing the outer chamber to receive combustion gases from the engine during the operation thereof. A first input conduit has an input connectable to a fuel source for receiving fuel therefrom and an output. A first output conduit has an input communicating with the output of the first input conduit and an output connectable to a first cylinder of an engine. A first combustion gas conduit has an input communicating with the interior of the outer chamber and an output communicating with the input of the first output conduit. An injection conduit has an input connectable to the fuel source and an output communicating with the interior of the inner chamber. A first venturi has an input communicating with the interior of the inner chamber and an output communicating with the first output conduit.

The fuel mixer box may also include a second input conduit having an input connectable to the fuel source for receiving fuel therefrom and an output. A second output conduit has an input communicating with the input of the second input conduit and an output connectable to a second cylinder of the engine. A second combustion gas conduit has an input communicating with the interior of the outer chamber and an output communicating with the input of the second output conduit. A second venturi has an input communicating with the interior of the inner chamber and an output communicating with the second output conduit. A partition is positioned within the outer chamber between the inputs of the first and second combustion gas conduits. In addition, a butterfly valve may be disposed in the first and second output conduits. The butterfly valve is movable between a full throttle position and a closed position.

In accordance with a still further aspect of the present invention, a fuel mixer box is provided for supplying a fuel mixture to each cylinder of an engine. The fuel mixer box includes a housing defining an outer chamber. The housing has an opening therein for allowing the outer chamber to receive combustion gases generated by the engine during the operation thereof. The first input conduit has an input connectable to a fuel source for receiving fuel therefrom and an output. A first output conduit has an input communicating with the output of the first input conduit and an output connectable to a first cylinder of the engine. A first combustion gas conduit has an input communicating with the interior of the outer chamber and an output communicating with the input of the first output conduit. A second input conduit has an input connectable to the fuel source for receiving fuel therefrom and an output conduit. A second output conduit has an input communicating with the output of the second input conduit and the output connectable to a second cylinder of the engine. A second combustion gas conduit has an input communicating with the interior of the outer chamber and an output communicating with the input of the second output conduit. A partition is disposed within the outer chamber between the inputs of the first and second combustion gas conduits. An injection structure is operatively connectable to the fuel source for injecting fuel directly into the first and second output conduits.

The housing may also define an inner chamber isolated from the outer chamber. The injection structure includes an injection conduit having an input connectable to the fuel source and an output communicating with the interior of the inner chamber. The injection structure also includes a venturi having an input communicating with the interior of the inner chamber and an output communicating with the first output conduit. A second venturi has an input communicating with the interior of the inner chamber and an output communicating with the second output conduit. A panel may be provided within the housing. The panel is movable between the first opened position allowing access to the interior of the inner chamber and a closed position isolating the inner chamber from the outer chamber.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings.

DETAILED DESCRIPTION OF THE DRAWINGS

Figure 1:
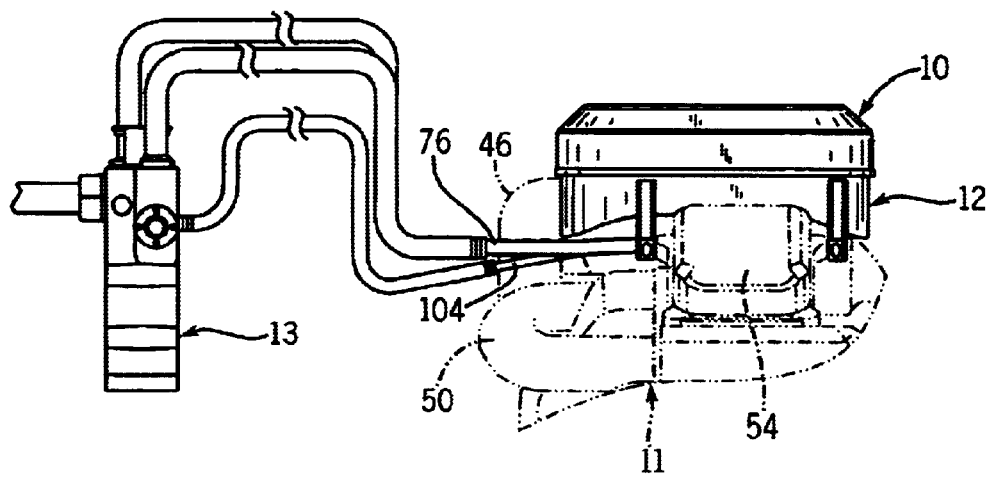
FIG. 1 is a side elevational view of a fuel mixer box in accordance with the present invention mounted on a conventional internal combustion engine and operatively connected to a fuel demand regulator.

Referring to FIG. 1, a fuel mixer box in accordance with the present invention is generally designated by the reference numeral 10. As hereinafter described, fuel mixer box 10 is mounted on a conventional internal combustion engine 11. In addition, as hereinafter described, fuel mixer box 10 is operatively connected to a fuel demand regulator 13. Fuel demand regulator 13 is fully described in U.S. Pat. No. 6,443,130, entitled "Fuel Demand Regulator" assigned to the assignee of the present application and incorporated herein by reference.

Figure 3:
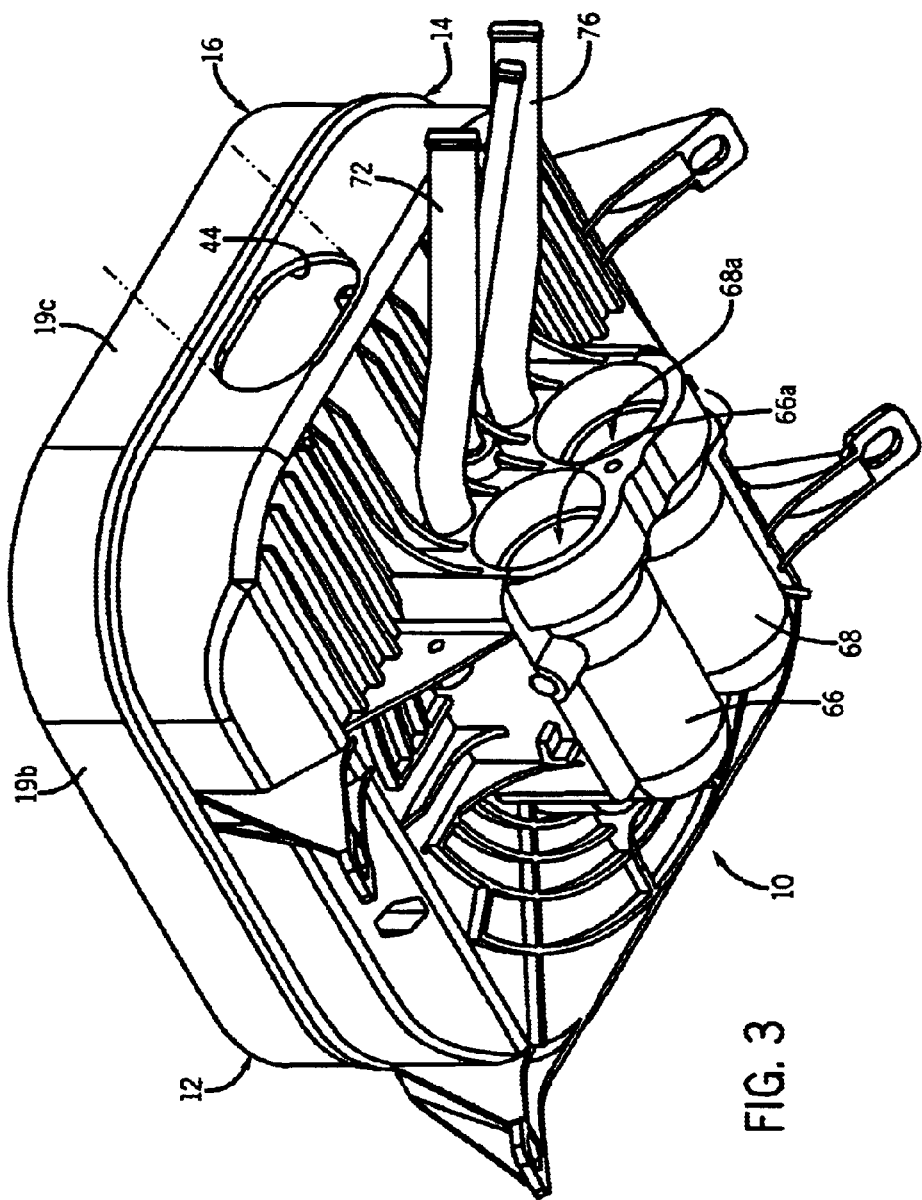
FIG. 3 is an isometric view of the fuel mixer box of the present invention.
Figure 4:
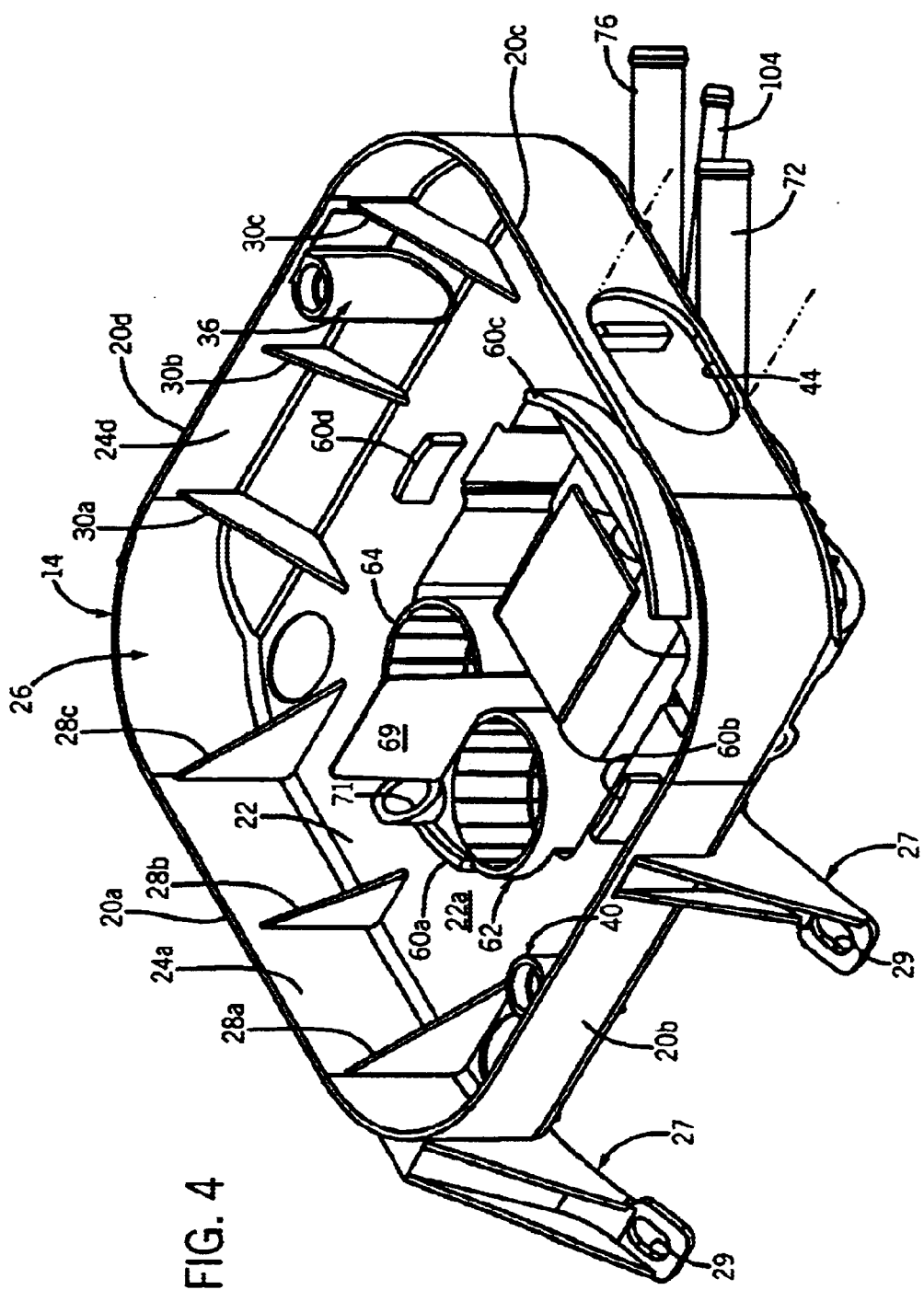
FIG. 4 is an isometric view, with the cover removed, of the fuel mixer box of the present invention.
Figure 5:
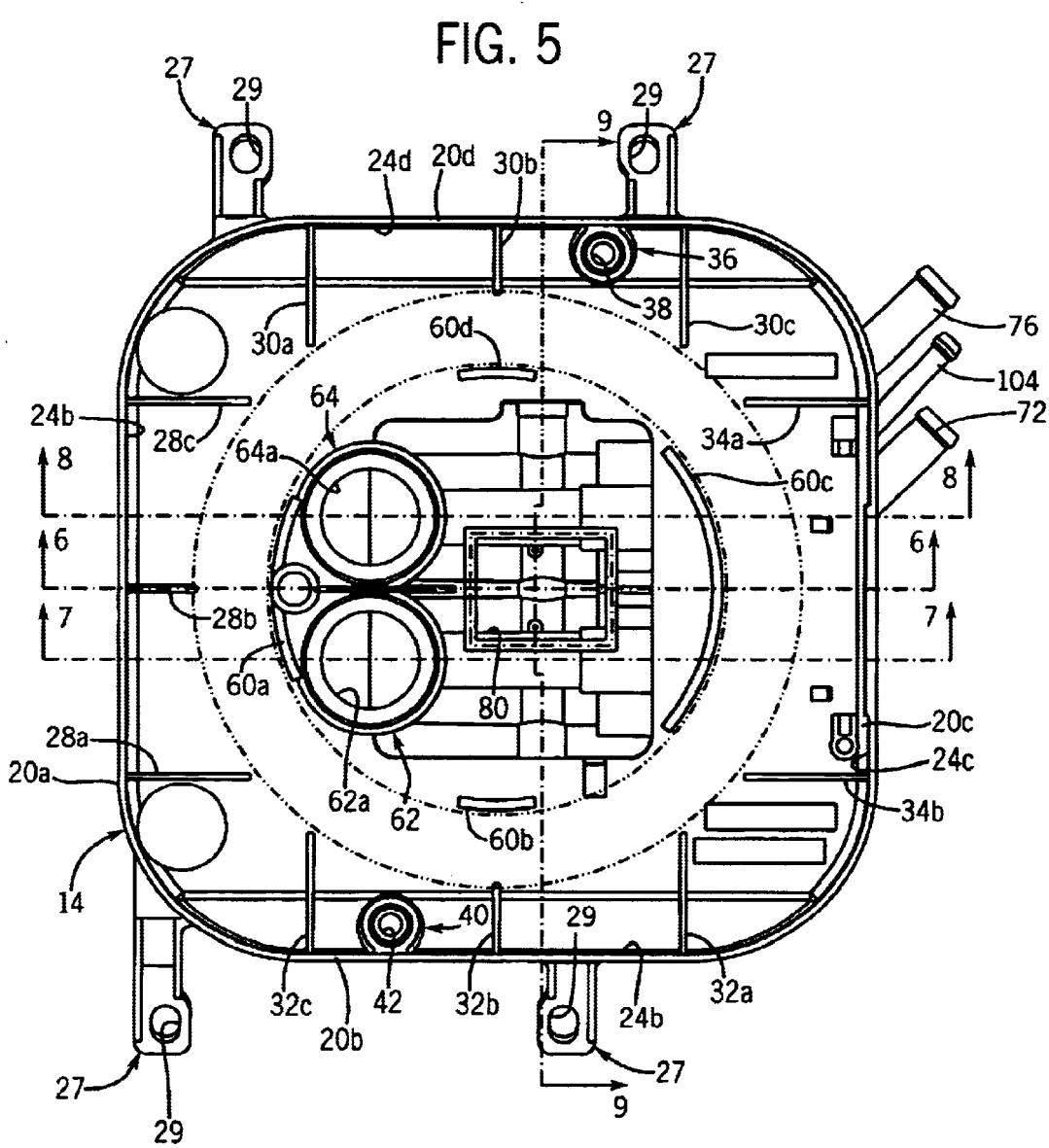
FIG. 5 is a top plan view of the fuel mixer box of FIG. 4.

Referring to FIGS. 3–4, fuel mixer box 10 includes housing 12 defined by housing portion 14 and cover 16 mounted thereon. Cover 16 includes an upper generally horizontal wall 17 having sidewalls 19a–d depending from the outer periphery thereof. A generally L-shaped lip 21 extends from the terminal ends of vertical sidewalls 19a–d and define a cavity for receiving the upper ends of vertical sidewalls 20a–20d of housing portion 14, as hereinafter described.

As best seen in FIG. 4, housing portion 14 is defined by vertical sidewalls 20a–20d and by horizontal lower wall 22. Cover 16, inner faces 24a–24d of sidewalls 20a–d, respectively, and upper surface 22a of wall 22 define chamber 26 within housing 12. A plurality of legs 27 project from lower housing portion 14 of housing 12. Apertures 29 extend through the terminal ends of legs 27 to facilitate the mounting of housing 12 to engine 11.

In order to add strength and stability to housing portion 14, a first set of gussets 28a–c extend between inner face 24a of sidewall 20a and upper surface 22a of wall 22. A second set of gussets 30a–c extend between inner face 24d of sidewall 20d and upper surface 22a of wall 22. A third set of gussets 32a–c extend between inner face 24c of sidewall 20c and upper surface 22a of wall 22. A pair of gussets 34 may extend between inner face 24c of sidewall 20c. Housing portion 14 also includes a generally cylindrical vertical tube 36 positioned adjacent to and interconnected to inner face 24d of sidewall 20d. Tube 36 includes threaded bore 38 therethrough to facilitate the connection of cover 16 to lower housing portion 14. In addition, generally cylindrical tube 40 is positioned adjacent to and interconnected to inner face 24b of sidewall 20b. Tube 40 includes threaded bore 42 therein to facilitate the connection of cover 16 to lower housing portion 14.

Figure 2:
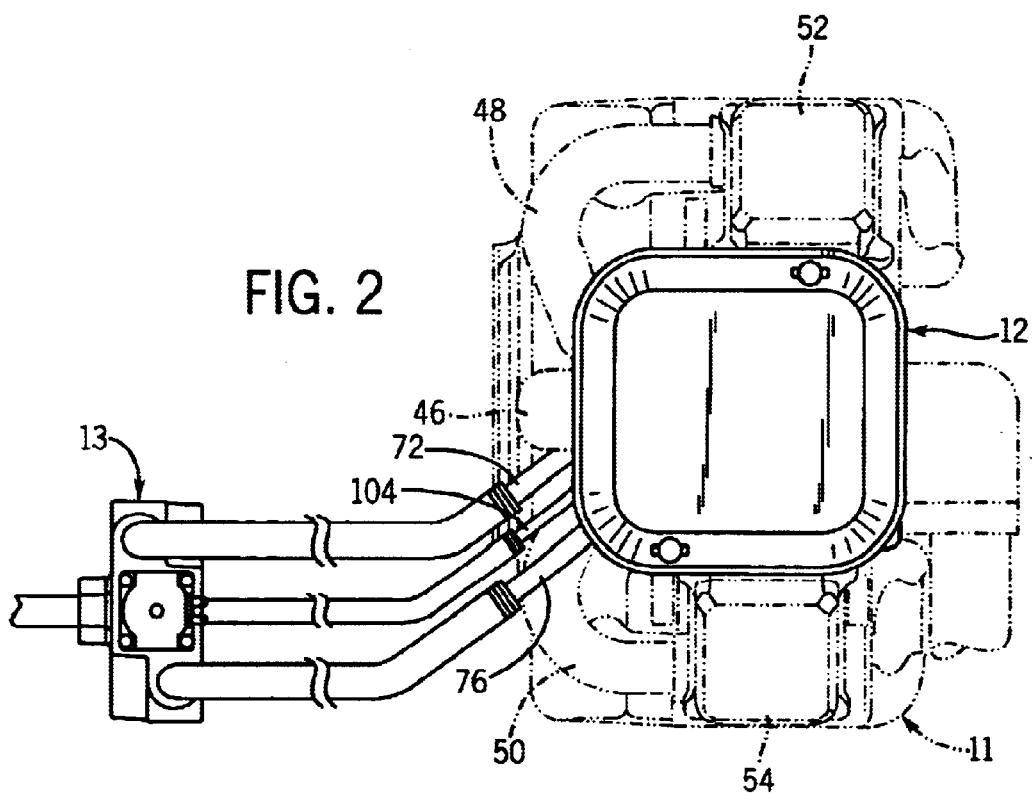
FIG. 2 is a top plan view of the fuel mixer box of FIG. 1.

Sidewall 20c of lower housing portion 14 further includes an opening 44. As best seen in FIGS. 1 and 2, a first end of hose 46 communicates with opening 44 in sidewall 20c of lower housing portion 14 and a second, opposite end of hose 46 communicates with the output of hoses 48 and 50. The inputs of hoses 48 and 50 are connected to the outputs of corresponding breathers 52 and 54, respectively. As is conventional, breathers 52 and 54 are mountable on corresponding cylinder heads of a crankcase of internal combustion engine 11 in order to separate oil from the combustion gases that may pass between the piston rings and the cylinder walls of the cylinders that house the pistons during operation of internal combustion engine 12.

A plurality of vertical walls 60a–d project from upper surface 22a of wall 20a of lower housing portion 14. Vertical walls 60a–60d are generally arcuate and positioned radially inward from the inner bonding interfaces 24a–d of sidewalls 20a–d, respectively. Vertical wall 60c is aligned with and positioned radially inward of opening 24 in sidewall 20c of lower housing portion 14 so as to diffuse the combustion gases flowing into chamber 26 from breathers 52 and 54 through hoses 48 and 50, respectively, and hose 46.

Figure 8:
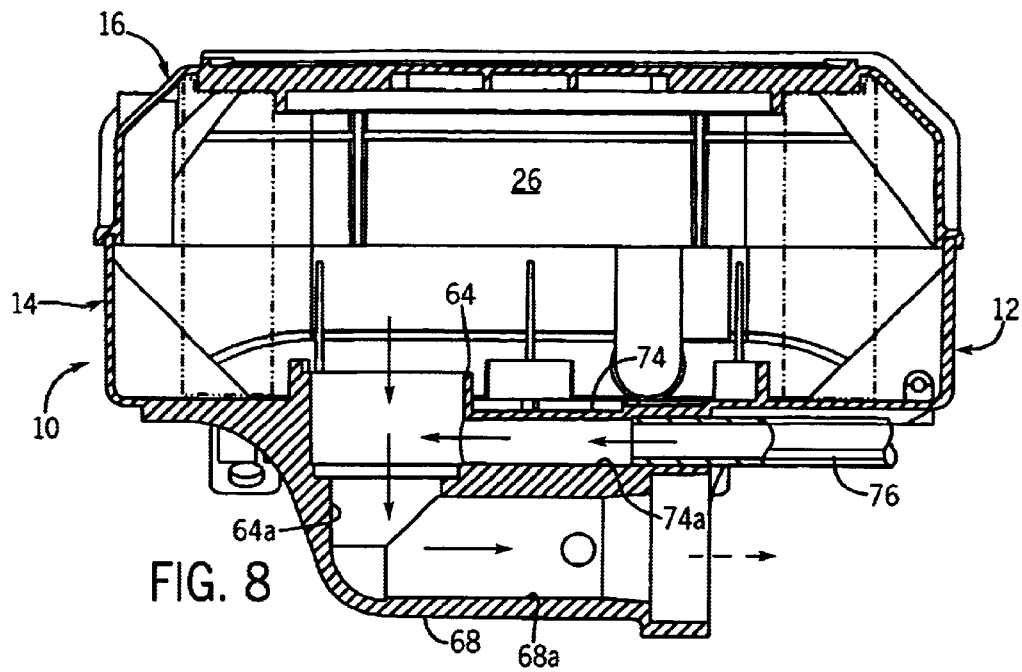
FIG. 8 is a cross-sectional view of the fuel mixer box of the present invention taken along line 8—8 of FIG. 5.
Figure 7:
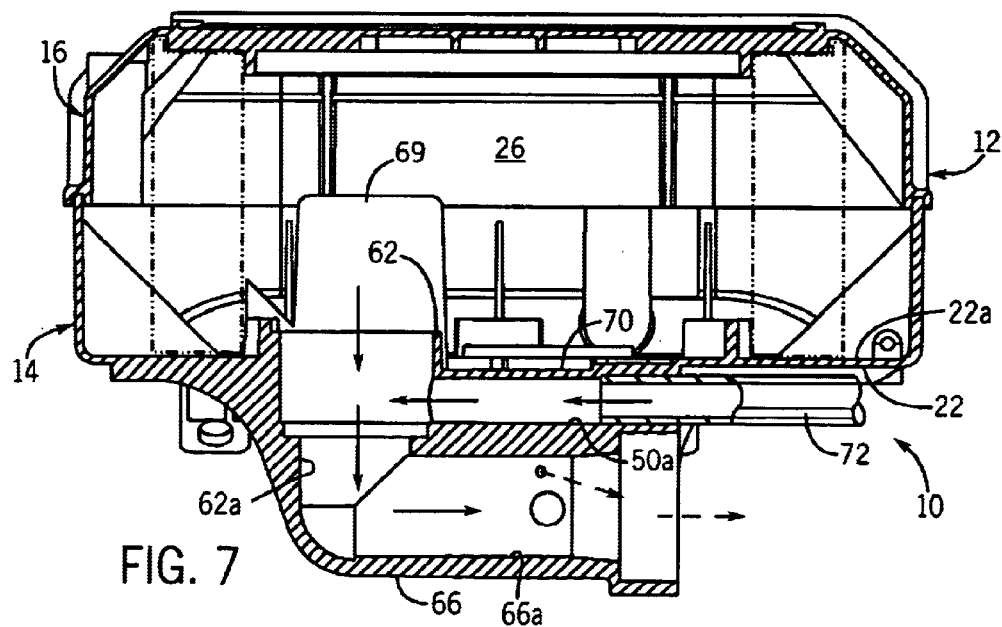
FIG. 7 is a cross-sectional view of the fuel mixer box of the present invention taken along line 7—7 of FIG. 5.
Figure 9:
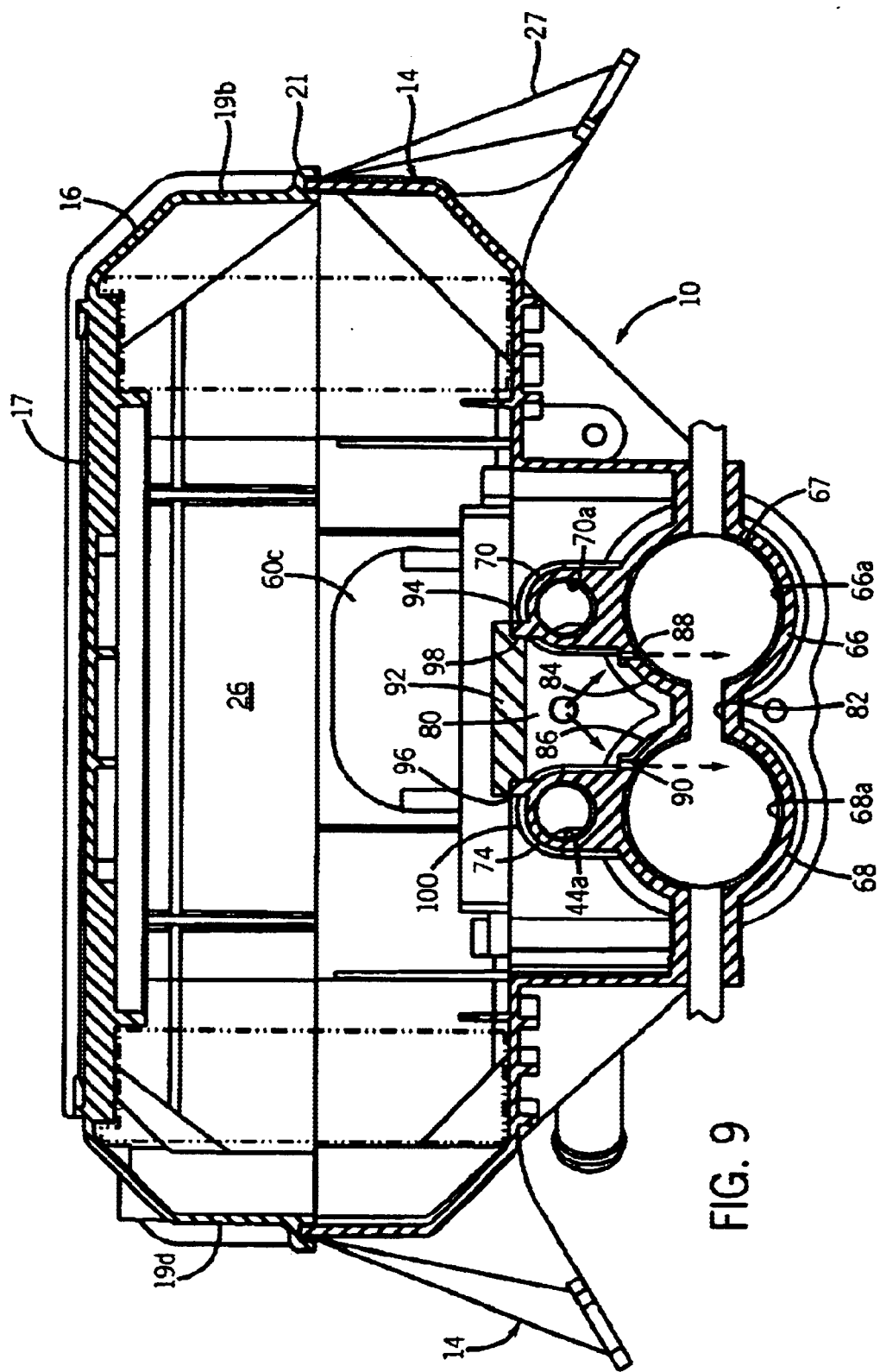
FIG. 9 is a cross-sectional view of the fuel mixer box of the present invention taken along line 9—9 of FIG. 5.

As shown in FIGS. 7–8, first and second generally tubular combustion gas conduits 62 and 64, respectively, extend through lower wall 22 and define corresponding passageways 62a and 64a, respectively. The input of passageway 62a of first combustion gas conduit 62 communicates with chamber 26 within housing 12 and the output of passageway 62a communicates with the input of passageway 66a through first output conduit 66. Similarly, the input of passageway 64a through second combustion gas conduit 64 communicates with chamber 26 within housing 12 and the output of passageway 64a through second combustion gas conduit 64 communicates with the input of passageway 68a through second output conduit 68. Butterfly valve 67 may be disposed in passageways 66a and 68a of output conduits 66 and 68, respectively, to independently control the flow of fuel mixture therethrough. As is conventional, butterfly valve 67 is movable between an open or full throttle position and a closed position.

Partition 69 projects upwardly from upper surface 22a of wall 22 between first and second combustion gas conduit 62 and 64, respectively. Partition 69 serves to isolate the input of passageway 62a of first combustion gas conduit 62 from the input of passageway 64a of second combustion gas conduit 64. In addition, sloped surface 71 projects vertically from upper surface 22a of wall 22 of housing portion 14 to deflect combustion gases within chamber 26 towards inputs of passageways 62a and 64a of first and second combustion gas conduit 62 and 64, respectively, for reasons hereinafter described.

Housing portion 14 of housing 12 further defines first input conduit 70 having passageway 70a therethrough. Passageway 70a through first input conduit 70 has an input communicating with a first outlet of fuel demand regulator 14 through hose 72. The output of passageway 70a through first input conduit 70 communicates with passageway 62a through first combustion gas conduit 62, and hence, with the input to passageway 66a through first output conduit 66.

Housing portion 14 of housing 12 further defines second input conduit 74 having passageway 74a therethrough. The input to passageway 74a through second input conduit 74 communicates with a second outlet of fuel demand regulator 14 through hose 76. The output of passageway 74a through second input conduit 74 communicates with passageway 64a through second combustion gas conduit 64, and hence, with the input to passageway 68a through second output conduit 68.

Housing portion 14 of housing 12 further defines fuel injection chamber 80 positioned between first and second input conduits 70 and 74, respectively. Fuel injection chamber 80 is partially defined by lower wall 82 having first portion 84 that separates fuel injection chamber 80 from passageway 66a through first output conduit 66 and second portion 86 that separates fuel injection chamber 80 from passageway 68a through second output conduit 68. First portion 84 of lower wall 82 includes first venturi 88 therethrough so as to allow fuel injection chamber 80 to communicate with passageway 66b through first output conduit 66. Second venturi 90 through second portion 86 of lower wall 82 allows fuel injection chamber 80 to also communicate with passageway 68a through second output conduit 68. For reasons hereinafter described, the dimensions of venturis 88 and 90 may be varied by a user. It is noted that fuel injection chamber 80 is isolated from chamber 26 within housing portion 14 of housing 12 by removable panel 92. Panel 92 includes grooves 94 and 96 that receive corresponding supports 98 and 100 that project vertically towards cover 16 from corresponding input conduits 70 and 74, respectively, so as to allow panel 92 to be positioned thereon.

Figure 6:
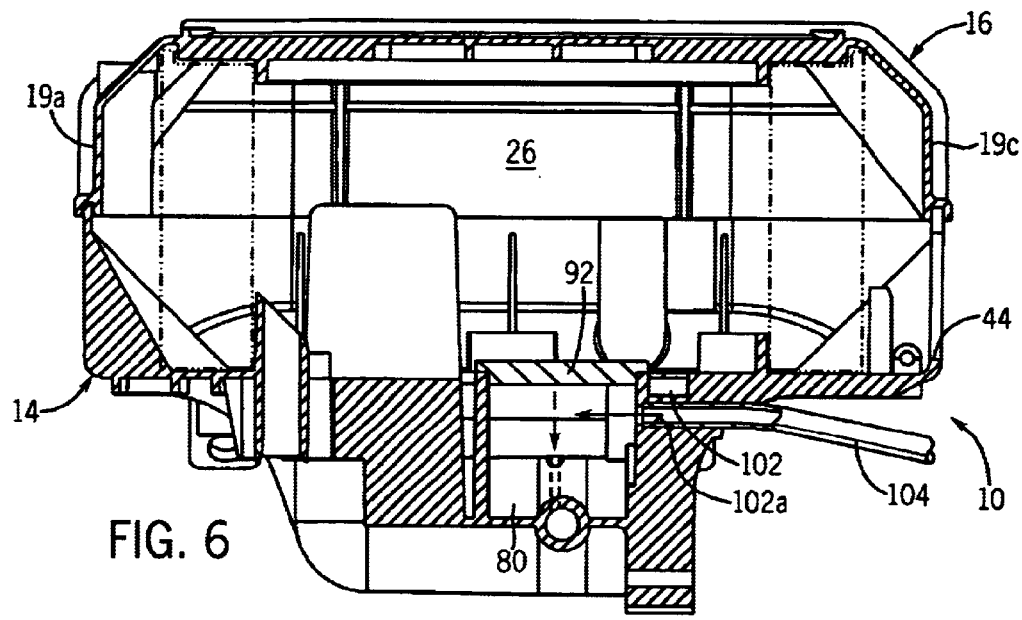
FIG. 6 is a cross-sectional view of the fuel mixer box of the present invention taken along line 6—6 of FIG. 5.
Figure 10:
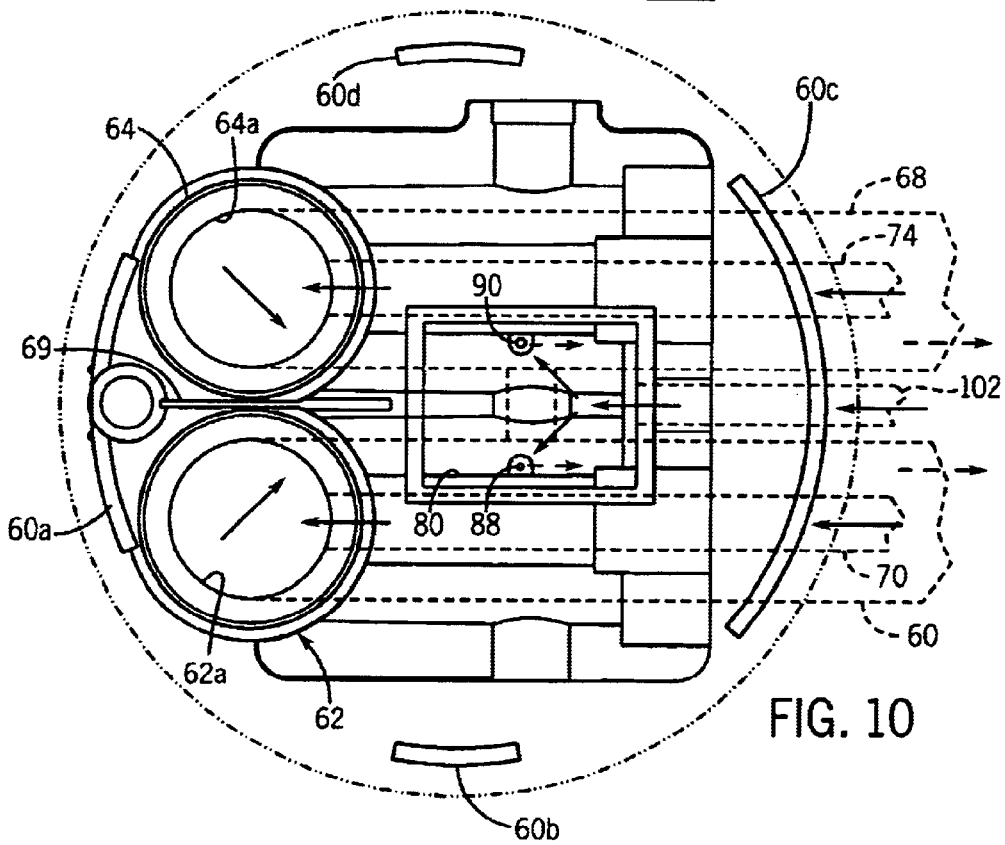
FIG. 10 is a top plan, with portions broken away, of the fuel mixer box of the present invention.

As best seen in FIG. 6, fuel injection chamber 80 communicates with the output of passageway 102a through injection conduit 102 defined by housing portion 14 of housing 12. The input to passageway 102a of injection conduit 102 is connected by hose 104 to a constant fuel source during operation of engine 12. It can be appreciated that fuel demand regulator 13 may be modified to provide constant fuel to hose 104 during operation of engine 11.

In operation, when engine 11 is started, a vacuum is generated by each cylinder of engine 11 to draw fuel demand regulator 13, as hereinafter described. In addition, during operation of engine 11, fuel demand regulator 13 also provides a constant source of fuel to injection conduit 102 through hose 104. By way of example, fuel is drawn through hose 72 from fuel demand regular 14 into first input conduit 70. The fuel flowing through first input conduit 70 mixes with combustion gases supplied to chamber 26 in housing 12 within first combustion gas chamber 62 to form a fuel mixture. As herefore described, partition 69 isolates the inputs of passageways 62a and 64a through combustion gas conduit 62 and 64, respectively, such that the vacuum generated by one of the cylinders of engine 11 does not effect the flow of the fuel mixture into the other cylinder of the engine. The fuel mixture flows through first output conduit 66 and is provided to the first cylinder of engine 11.

Similarly, during operation of engine 11, fuel is drawn through hose 76 from fuel demand regulator 14 into second input conduit 74. The fuel flowing through second input conduit 74 mixes with combustion gases supplied to chamber 26 in housing 12 within second combustion chamber 64 to form a fuel mixture. The fuel mixture flows through second output conduit 68 and is provided to the second cylinder of engine 11. As heretofore described, the fuel mixtures enter the combustion chambers in corresponding cylinders on first sides of the pistons. The fuel mixtures in the chambers are ignited so as to cause linear motion of the pistons within their corresponding cylinders. The linear motion of the pistons is converted into rotational motion by a crankshaft. As is conventional, the portions of the combustion gases that pass between the piston rings and the cylinder walls of the cylinders that house the pistons are routed to chamber 26 in housing 12, as heretofore described.

In order to balance the fuel in the fuel mixture provided to each cylinder of engine 11, it is contemplated to add fuel directly to the fuel mixtures flowing through first and second output conduits 66 and 68, respectively. As described, the fuel within injection conduit 102 flows into fuel injection chamber 80, through venturis 88 and 90, and directly into corresponding output conduits 66 and 68, respectively. The dimensions of venturis 88 and 90 may be modified to insure the optimum volume of fuel is provided to both fuel mixtures during all operating conditions of engine 11, including the starting and idling of the same.

Various modes of carrying out the invention are contemplated as being within the scope of the following claims particularly pointing out and distinctly claiming the subject matter which is regarded as the invention.

We claim:

1. A fuel mixer box for providing a fuel mixture to each cylinder of an engine, comprising:
   a first input conduit having an input connectable to a fuel source for receiving fuel therefrom and an output;
   a first output conduit having an input communicating with the output of the first input conduit and an output connectable to a first cylinder of the engine;
   a injection conduit having an input connectable to the fuel source and an output communicating with the output conduit; and
   a housing having an interior, and an opening therein for allowing combustion gases generated by the engine to enter the housing.

2. The fuel mixer box of claim 1 wherein the housing defines a fuel mixture chamber within the interior thereof for interconnecting the output of the input conduit and the input of the output conduit, the fuel mixture chamber communicating with the interior of the housing.

3. The fuel mixture box of claim 1 further comprising a butterfly valve disposed in the first output conduit, the butterfly valve movable between a full throttle position and a closed position.

4. A fuel mixer box for providing a fuel mixture to each cylinder of an engine, comprising:
   a housing defining an outer chamber and an inner chamber isolated from the outer chamber, the housing having an opening therein for allowing the outer chamber to receive combustion gases generated by the engine during the operation thereof;
   a first input conduit having an input connectable to a fuel source for receiving fuel therefrom and an output;
   a first output conduit having an input communicating with the output of the first input conduit and an output connectable to a first cylinder of the engine;
   a first combustion gas conduit having an input communicating with the interior of the outer chamber and an output communicating with the input of the first output conduit;
   an injection conduit having an input connectable to the fuel source and an output communicating with the interior of the inner chamber; and
   a first venturi having an input communicating with the interior of the inner chamber and an output communicating with the first output conduit.

5. The fuel mixer box of claim 4 further comprising:
   a second input conduit having an input connectable to the fuel source for receiving fuel therefrom and an output;
   a second output conduit having an input communicating with the output of the second input conduit and an output connectable to a second cylinder of the engine;
   a second combustion gas conduit having an input communicating with the interior of the outer chamber and an output communicating with the input of the second output conduit;
   a second venturi having an input communicating with the interior of the inner chamber and an output communicating with the second output conduit.

6. The fuel mixer box of claim 5 further comprising a partition disposed within the outer chamber between the inputs of the first and second combustion gas conduits.

7. The fuel mixer box of claim 6 further comprising a butterfly valve disposed in the first and second output conduits, the butterfly valve movable between a full throttle position and a closed position.

8. A fuel mixer box for providing a fuel mixture to each cylinder of an engine, comprising:
   a housing defining an outer chamber, the housing having an opening therein for allowing the outer chamber to receive combustion gases generated by the engine during the operation thereof;
   a first input conduit having an input connectable to a fuel source for receiving fuel therefrom and an output;
   a first output conduit having an input communicating with the output of the first input conduit and an output connectable to a first cylinder of the engine;
   a first combustion gas conduit having an input communicating with the interior of the outer chamber and an output communicating with the input of the first output conduit;
   a second input conduit having an input connectable to the fuel source for receiving fuel therefrom and an output;
   a second output conduit having an input communicating with the output of the second input conduit and an output connectable to a second cylinder of the engine;
   a second combustion gas conduit having an input communicating with the interior of the outer chamber and an output communicating with the input of the second output conduit;
   a partition disposed within the outer chamber between the inputs of the first and second combustion gas conduits; and
   an injection structure operatively connected to the fuel source for injecting fuel directly into the first and second output conduits.

9. The fuel mixer box of claim 8 wherein the housing defines an inner chamber isolated from the outer chamber.

10. The fuel mixer box of claim 9 wherein the injection structure includes an injection conduit having an input connectable to the fuel source and an output communicating with the interior of the inner chamber.

11. The fuel mixer box of claim 10 wherein the injection structure further includes:
   a first venturi having an input communicating with the interior of the inner chamber and an output communicating with the first output conduit; and
   a second venturi having an input communicating with the interior of the inner chamber and an output communicating with the second output conduit.

12. The fuel mixer box of claim 9 further comprising a panel within the housing, the panel movable between a first open position for allowing access to the interior of the inner chamber and a closed position isolating the inner chamber from the outer chamber.

13. A fuel mixer box for providing a fuel mixture to each cylinder of an engine, comprising:
- a first input conduit having an input connectable to a fuel source for receiving fuel therefrom and an output;
- a first output conduit having an input communicating with the output of the first input conduit and an output connectable to a first cylinder of the engine;
- a injection conduit having an input connectable to the fuel source and an output communicating with the output conduit;
- a second input conduit having an input connectable to the fuel source for receiving fuel therefrom and an output; and
- a second output conduit having an input communicating with the output of the second input conduit and an output connectable to a second cylinder of the engine.

14. The fuel mixer box of claim 13 further comprising an injection chamber having an interior and wherein the output of the injection conduit communicates with the interior of the injection chamber.

15. The fuel mixer box of claim 14 wherein the injection chamber includes a first venturi having an input communicating with the interior of the injection chamber and an output communicating with the first output conduit and a second venturi having an input communicating with the interior of the injection chamber and an output communicating with the second output conduit.

16. The fuel mixer box of claim 13 further comprising:
- a housing having an interior, the housing having an opening therein for receiving combustion gases generated by the engine during operation thereof;
- a first combustion gas conduit having an input communicating with the interior of the housing and an output communicating with the first output conduit; and
- a second combustion gas conduit having an input communicating with the interior of the housing and an output communicating with the second output conduit.

17. The fuel mixer box of claim 16 further comprising a partition disposed within the housing between the inputs of the first and second combustion conduits.

* * * * *